United States Patent
Natarajan et al.

(10) Patent No.: US 11,775,886 B2
(45) Date of Patent: Oct. 3, 2023

(54) COMBINING GROUP-LEVEL AND ITEM-LEVEL INFORMATION FOR FORECASTING BY EMPIRICAL BAYESIAN DECONVOLUTION BASED TECHNIQUE

(71) Applicant: Amazon Technologies, Inc., Seattle, WA (US)

(72) Inventors: Ramesh Natarajan, Pleasantville, NY (US); Jonathan Hosking, Scarsdale, NY (US)

(73) Assignee: Amazon Technologies, Inc., Seattle, WA (US)

( * ) Notice: Subject to any disclaimer, the term of this patent is extended or adjusted under 35 U.S.C. 154(b) by 1221 days.

(21) Appl. No.: 16/218,319

(22) Filed: Dec. 12, 2018

(65) Prior Publication Data
US 2020/0193229 A1    Jun. 18, 2020

(51) Int. Cl.
| | |
|---|---|
| G06Q 10/04 | (2023.01) |
| G06F 16/906 | (2019.01) |
| G06Q 10/0637 | (2023.01) |
| G06F 18/214 | (2023.01) |
| G06F 18/20 | (2023.01) |

(52) U.S. Cl.
CPC ........... *G06Q 10/04* (2013.01); *G06F 16/906* (2019.01); *G06F 18/2148* (2023.01); *G06F 18/29* (2023.01); *G06Q 10/06375* (2013.01)

(58) Field of Classification Search
CPC ................................ G06K 9/62; G06Q 10/04
See application file for complete search history.

(56) References Cited

U.S. PATENT DOCUMENTS

| | | | | |
|---|---|---|---|---|
| 6,751,600 | B1 * | 6/2004 | Wolin | G06F 16/353 |
| | | | | 707/E17.09 |
| 9,172,738 | B1 * | 10/2015 | daCosta | G06Q 10/087 |
| 2014/0075004 | A1 * | 3/2014 | Van Dusen | H04L 41/04 |
| | | | | 709/223 |
| 2016/0027051 | A1 * | 1/2016 | Gross | G06Q 30/0276 |
| | | | | 705/14.54 |

(Continued)

FOREIGN PATENT DOCUMENTS

CA    3023623 A1 *    1/2018    ............ G01J 3/0229

OTHER PUBLICATIONS

Narasimhan, Balasubramanian and Efron, Bradley; A G-Modeling Program for Deconvolution and Empirical Bayes Estimation, Stanford University, Department of Statistics, Dec. 2016. (Year: 2016).*

(Continued)

*Primary Examiner* — Kurtis Gills
(74) *Attorney, Agent, or Firm* — Robert C. Kowert; Kowert, Hood, Munyon, Rankin & Goetzel, P.C.

(57) ABSTRACT

A data set comprising records of state change events of items of an item collection, as well as records of asynchronous operations associated with the items, is obtained. The numbers of records in the data set may differ from one item to another. Using the data set, a Bayesian forecasting model employing a deconvolution algorithm is trained. The model generates estimates of metrics of a type of asynchronous operation using a combination of a category-level distribution of the asynchronous operation, an item-level distribution, and a category-versus item adjustment. A trained version of the model is stored.

20 Claims, 9 Drawing Sheets

(56) References Cited

U.S. PATENT DOCUMENTS

| | | | |
|---|---|---|---|
| 2016/0034305 A1* | 2/2016 | Shear | H04L 47/70 707/722 |
| 2017/0124484 A1* | 5/2017 | Thompson | G06F 3/0484 |
| 2018/0121766 A1* | 5/2018 | McCord | G06N 3/08 |

OTHER PUBLICATIONS

Balasubramanian Narasimhan et al., "A G-Modeling Program for Deconvolution and Empirical Bayes Estimation", Department of Statistics, Stanford University, Dec. 2016, pp. 1-19.

Bradley Efron, "Empirical Bayes deconvolution estimates", Retrieved from URL: Downloaded from https://academic.oup.com/biomet/article-abstract/103/1/1/2390141 on Oct. 29, 2018, pp. 1-20.

Bradley Efron et al., "ComputerAge Statistical Inference—Chapter 21 Empirical Bayes Estimation Strategies", Cambridge University Press, vol. 5, 2016, pp. 1-33.

K. Krishnamoorthy et al., "Inference for functions of parameters in discrete distributions based on fiducial approach: binomial and Poisson cases", Journal of Statistical Planning and Inference, 2010, pp. 1182-1192.

U.S. Appl. No. 15/153,713, filed May 12, 2016, Matthias Seeger et al.

\* cited by examiner

COMBINING GROUP-LEVEL AND ITEM-LEVEL INFORMATION FOR FORECASTING BY EMPIRICAL BAYESIAN DECONVOLUTION BASED TECHNIQUE

BACKGROUND

For many kinds of applications, the ability to generate accurate forecasts of future values of various measures (e.g., failures of elements of computing devices, the number of customer support interactions to be expected for a given item or product, the number of times a patient undergoing a particular medical treatment will experience relapses or serious side effects etc.) based on previously collected data is a critical requirement. A number of different types of forecasting heuristics and/or models may be used, depending on the specific type of problem domain being addressed, the assumed semantic relationships between the to-be-predicted measures and the available data points, and so on.

Ideally, a data set that is to be used to train a forecasting model for a particular type of event or item should contain numerous examples of the events or items, from which salient relationships regarding a particular to-be-predicted quantity and other measured quantities can be learned. However, in today's highly competitive fast-moving environments, the set of entities for which predictions or forecasts have to be made is often very large and often changes rapidly, such that the number of relevant examples may not be high enough for some types of forecasting techniques. As such, forecasts for individual items or events may sometimes have to rely on learning from peer group items or peer group events. For example, when making predictions regarding the number of customer support interactions to be expected during some future time period with respect to a particular type of electronic item, a set of similar-seeming items may be identified, and the records of customer support interactions of such similar items may be analyzed.

Some peer group based prediction techniques may be less than optimal from several reasons. For example, the manner in which peer groups are defined may not necessarily reflect actual homogeneity among the group members with respect to various relevant properties and the targeted prediction measures, and the minimum size of an acceptable peer group may be defined somewhat arbitrarily. As a result, the forecasts generated using such approaches may be less accurate than desired.

Figure 1:
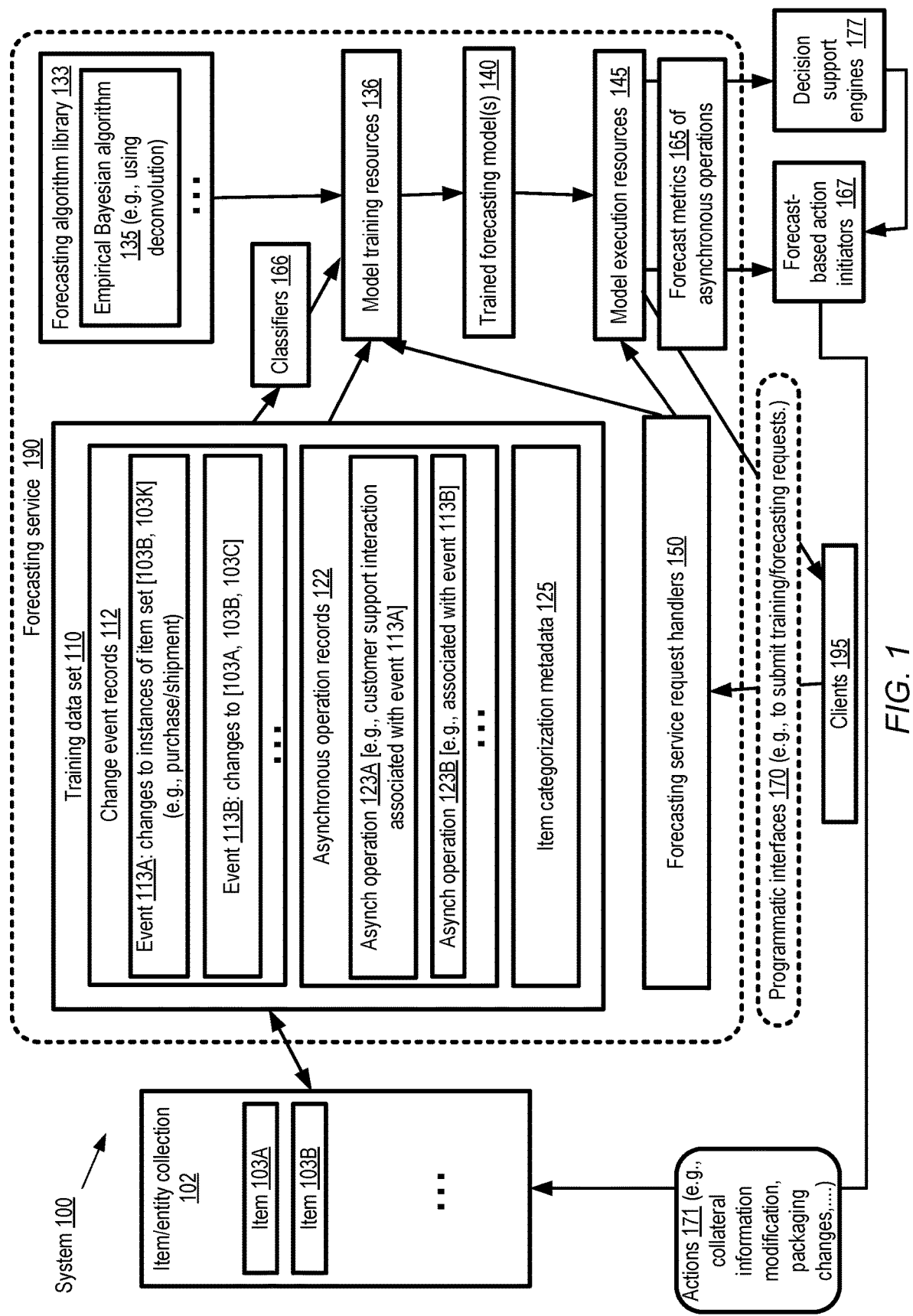
FIG. 1 illustrates an example system environment in which forecasts of asynchronous operations associated with recorded events may be obtained from a forecasting model which employs an empirical Bayesian methodology, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for generating forecasts of asynchronous operations associated with recorded events using an empirical Bayesian methodology are described. In at least some embodiments, records of a plurality of events at an organization may be collected, with individual events representing state changes of one or more instances of items of an item collection of the organization, and such records may be used for making various types of forecasts or predictions in accordance with technical and/or business objectives of the organizations. For example, an item collection may comprise products or services that may be available for sale at an online retailer, the set of computing devices at a plurality of data centers of a large scale computing services provider, and so on. In the case of the computing devices example, individual events may for example represent activating the devices for use by customers, moving a computing device from one location to another, and so on. In the case of products or services, individual events may represent purchases or shipments of one or more items over the Internet, and so on.

Corresponding to individual ones of the items, a number of records of asynchronous operations may also be collected over time—e.g., records of customer support interactions associated with a given item or device for which a state change record was collected, whether a given device failed during some time period due to a hardware or software problem, whether a given item was damaged during delivery to a customer, whether a given item was returned, etc. Such operations may be termed "asynchronous" in various embodiments because they may occur at different times (often much later, and in some cases earlier) than the times at which the state changes of the associated items occur, and so it may not be straightforward to obtain various metrics of the complete set of asynchronous operations at or near the times of the state changes. From the perspective of the organization responsible for an item collection, the generation of accurate forecasts regarding various types of asynchronous operations may represent an important objective in various embodiments. For example, if it is possible to accurately predict the number of customer support interactions for various items, it may become possible to reduce the amount of resources that have to be dedicated to customer support—e.g., by providing a more comprehensive set of publicly-available answers to customer support questions/concerns for the items, by preparing automated responses to customer questions, and the like.

According to at least some embodiments, forecasts pertaining to the asynchronous operations may be generated using a network-accessible forecasting service or machine learning service. Such a service may include one or more computing devices which include instructions that upon execution on or across one or more processors perform various tasks associated with the forecasting. In some embodiments, a training data set for a forecaster may be obtained, comprising (a) records of a plurality of events pertaining to events of an item collection, (b) indicators of respective categories to which individual items of the item collection belong, and (c) records of one or more types of asynchronous operations associated with the events. A given event represented by a record of the training data set may, for example, represent a state change of one or more items of the item collection, such as a purchase transaction of one or more items, a shipment of one or more items in response to a received order, etc. At least one type of asynchronous operation may involve or result in usage of customer support resources (e.g., automated customer support systems, customer support engineers, or the like) of the organization in some embodiments. In various embodiments, the number of state change event records and/or the number of records of asynchronous operations may vary from one item to another in the training data set. It is noted that although purchases/sales/shipments of items are used frequently as examples of the types of events of records used for training forecasting models herein, the forecasting techniques described are not limited to any particular type of event or to any particular problem domain; such techniques may be applied to a variety of other problem domains in different embodiments, such as computing device fleet management, health management, and the like.

The instructions stored at the computing devices may, when executed, train, using the training data set, an empirical Bayesian forecasting model which employs a deconvolution algorithm in various embodiments. Such a model may generate, corresponding to an item of the item collection whose state has changed, an estimate of a metric of a first type of asynchronous operation, wherein the estimate is based at least in part on (a) a category-level distribution of the first type of asynchronous operation, corresponding to a first category of the respective categories to which the item belongs, (b) an item-level distribution of the first type of asynchronous operation, corresponding to the item, and (c) a category-versus-item adjustment in at least some embodiments. Estimates of the category-level and item-level distributions may be generated via the analysis of the training data set by the forecasting model in at least some embodiments. Conceptually, in various embodiments, respective importance levels may be assigned to the category-level information represented in the training data set for a peer group of items which may have been designated or identified as similar to the item in question, and to the item-level information, to determine the eventual item-level estimate as discussed below.

In at least some embodiments, the more examples there are in the training data set of recorded events representing state changes of a given item and associated asynchronous operations, and the narrower the item-level distribution is, the higher the relative weight that is assigned by the empirical Bayesian algorithm to the item-level distribution. In other words, in such embodiments, the extent of the reliance on category-level or group-level information to obtain the final estimate tends to decrease as more information about the item itself is available. The transition between the use of the category-level information and the item-level information is a smooth one in various embodiments, and does not involve a "step" change based on arbitrary counts of the number of records available in the training data set for the item alone versus the number of records available in the training data set for the category. This is in contrast to some other less smooth and less intuitive estimation methodologies, in which, for example, (a) as long as the number of item-level examples in the training data is below a threshold (which may be selected somewhat arbitrarily), only category-level information may be used to estimate metrics of asynchronous operations and (b) if the number of item-level examples equals or exceeds the threshold, only the item-level examples may be used to estimate the metrics.

A trained version of the empirical Bayesian forecasting model may be stored in various embodiments, e.g., at a persistent repository of a forecasting service. In response to a forecasting request pertaining to at least a first item, the trained version of the model may be used to obtain an estimated metric of one or more types of asynchronous events corresponding to the first item in at least some embodiments. Based on the forecast estimated metric, one or more operations with respect to at least some items of the item collection may be initiated in one embodiment—e.g., customer support information may be added to an online customer support database that can be accessed by users/purchasers of the items, items may be moved from one location to another, the packaging used for shipping items may be changed, and so on.

In various embodiments, as indicated above, a deconvolution based algorithm may be employed in the forecasting model. The "exposures" of the different items in the item collection (e.g., the counts, in the training data set, of the number of records of events and/or asynchronous operations pertaining to individual items) may differ in at least some embodiments—that is, not all items may have the same number of examples available. According to some embodiments, as indicated earlier, the category-versus-item adjustment corresponding to a particular item may be based at least in part on the number of records of events associated with that particular item that are included in the training data. In at least some embodiments, the category-versus-item adjustment may be based at least in part on a dispersion metric (e.g., a standard deviation, variance or the like) of the item-level distribution. For at least some training data sets, the category-level distribution may be multi-modal (e.g., with several peaks in the density graph), and the category-versus-item adjustment may shift the final estimate of the targeted metric towards one of the peaks. This illustrates one difference between the forecasting technique employed in such embodiments and some conventional techniques of combining information from an individual item and a peer group or category; in such conventional techniques, the adjustment applied to the item-level information is always towards a fixed value or zero. Another difference with respect to some conventional techniques is that such conventional techniques may assume that the "exposures", e.g. the counts of examples of different items in the training data, are the same.

In at least some embodiments, clients of the forecasting service may utilize any of a number of programmatic interfaces to interact with the service to obtain forecasting results. Such programmatic interfaces may include, for example, one or more web-based consoles, a set of application programming interfaces, command line tools, graphical user interfaces and the like in different embodiments. Using such interfaces, clients may submit requests to train forecasting models (which may also be referred to as forecasters), indicate sources from which the training data may be obtained, indicate destinations at which the trained version of the forecaster is to be stored, indicate forecast consumers (such as automated programs that generate actions directed to the item collection based on the forecasts) to which estimates of the forecasts for asynchronous operations should be sent, and so on in various embodiments.

In at least some embodiments, the forecasting service may automatically categorize items of the item collection, e.g., on the basis of various item-level properties indicated in the input data available. That is, in such embodiments, instead of relying on provided category identifiers for individual items to generate category-level information to be used in generating the forecasts, the forecasting service may itself classify at least some items of the item collection based on similarities identified in item properties (e.g., in the case of an item collection representing an inventory of an e-retailer, item size, cost, weight, producer/manufacturer, country of origin, etc.). In one embodiment, a given item may belong to several different categories or subcategories, e.g., based on a taxonomy identified by a client of the forecasting service or based on analysis of item properties, and one or more of the multiple categories may be selected by the forecasting service to generate category-level distributions which are then used in combination with item-level distribution information. In some implementations, one or more categories whose distributions are to be used to help generate an estimate of the asynchronous operations may be selected (from the multiple categories to which an item belongs) based at least in part on the populations of the categories—e.g., on the number of example records of items of the individual categories in the training data set. In one embodiment, estimates of distributions corresponding to several different categories to which an item belongs may be taken into account in the forecasting algorithm—that is, the forecast of asynchronous operations may be based on analysis of available information on multiple categories rather than just one category.

In various embodiments, a programmatic request to generate a forecast of asynchronous operations, with respect to one or more items, may be received at the forecasting service via one of the programmatic interfaces implemented at the service. In some embodiments, such forecast requests may be submitted periodically, e.g., for batches of items at a time. In other embodiments, such a forecast request may be submitted in real-time—e.g., when an event involving a state change of an item I1 occurs, a corresponding forecast request may be submitted. In at least one embodiment, forecast requests may be generated automatically for at least some types of asynchronous operations associated with an item, e.g., as soon as an event involving the item is detected. In at least some embodiments, in addition to providing more accurate forecasts, at least some level of insight into the reasoning behind the forecasts may be provided to clients and/or other interested parties such as data scientists—e.g., graphical views of the category-level distributions, the item-level distributions, the category-versus-item adjustment, etc., may be provided.

As one skilled in the art will appreciate in light of this disclosure, certain embodiments may be capable of achieving various advantages, including some or all of the following: (a) efficiently generating more accurate forecasts for various types of operations or events than may have been obtained using alternative approaches, (b) reducing the total amount of computational resources needed to identify and initiate actions to modify an item collection to achieve targeted objectives of the organization responsible for the item collection, and/or (c) enhancing the user experience of data scientists and/or other users by providing intuitive explanations of the reasoning used to arrive at forecasts.

Example System Environment

FIG. 1 illustrates an example system environment in which forecasts of asynchronous operations associated with recorded events may be obtained from a forecasting model which employs an empirical Bayesian deconvolution based methodology, according to at least some embodiments. As shown, system 100 may comprise various types of resources and data of a forecasting service 190, including for example model training resources 136, model execution resources 145, a forecasting algorithm library 133, and one or more training data sets 110 pertaining to items 103 of a dynamically changing item/entity collection 102 in the depicted embodiment. The item collection may include a plurality of items 103, including items 103A, 103B, and so on, for which change event records 112 and asynchronous operation records 122 may be collected and included in a training data set 110 to be used to generate one or more forecasting models. A given item may, for example, represent a product of an inventory, and occurrences of purchases or shipments of instances or copies of that item may be recorded in change event records 112. A given change event record 112 may represent the occurrence of one or more state changes of one or more instances of items of the item collection in at least some embodiments—e.g., event 113A may indicate changes to instances of an item set comprising items 103B and 103K, event 113B may indicate changes to an item set comprising items 103A, 103B and 103C, and so on. Note that the term "item" may apply to entities of various kinds in different embodiments, including living beings (for example, the collection 102 may comprise human beings, and the event records may represent medical events of the human beings), and not just to inanimate objects such as products or devices.

In addition to the change event records 112, a training data set 110 may include a set of asynchronous operation records 122 as well as item categorization metadata 125 in the depicted embodiment. Records 122 may represent events or operations that are related to the state changes represented in change event records, and may contribute to the eventual overall impact or cost associated with the state change events (where the semantics of the "cost" may vary depending on the types of operations and state changes), but may not necessarily occur concurrently or synchronously with respect to the state changes themselves. For example, in a scenario in which a state change event 113 represents a purchase of some set of items from an online catalog, a customer support interaction about one of the items sold may represent one example of an asynchronous operation, which may occur at some later time than the purchase, or in some cases may occur prior to the purchase (e.g., a potential buyer may interact with a customer support service or agent to ask questions about a particular feature of an item). A given asynchronous operation 123 may be associated with or related to one or more events 113 in the depicted embodiment. For example, in the scenario shown in FIG. 1, asynchronous operation 123 may be related to event 113A, and asynchronous operation 123B may be related to event 113B. The amount of information available with respect to individual ones of the items 103 in the training data set 110 may differ from one item to another in at least some embodiments.

In at least some embodiments, the training data set 110 may also include at least some item categorization metadata 125, which can be used to group the items whose state changes are indicated in record 112 into logically related categories or classes. In some embodiments, the categorization metadata 125 may simply indicate respective categories into which individual ones of the items 103 have already been grouped, e.g., as part of organizing or cataloging the item collection 102. In other embodiments, the metadata 125 may not necessarily directly identify the category or categories to which a given item 103 belongs, but may instead list or indicate properties or attributes of individual items, which can be analyzed to classify the items into peer groups (groups of related items), e.g., with the help of one or more item classifiers 166. In one embodiment, categorization metadata for a given item of an item collection corresponding to an e-retailer's inventory may, for example, include (a) product group or sub-group, (b) size, (c) color, (d) price, (e) temporal information about an occurrence of state change events of the item, (f) shipping information, and/or (g) information about one or more other items whose state changed in a common state change event with a given item. Any combination of such available attribute values may be used by classifiers 166 in some embodiments to define item categories.

In various embodiments, a network-accessible forecasting service 190 at which models may be trained (using training data sets similar to data set 110) and executed may implement a set of programmatic interfaces 170 that can be used by clients 195 to submit various types of requests. The programmatic interfaces may include, for example, a set of application programming interfaces (APIs), one or more web-based consoles, command line tools, graphical user interfaces or the like. A client 195 may submit a training request for a model to be used to forecast asynchronous operations in some embodiments via interfaces 170. The request may indicate one or more sources where a training data set 110 pertaining to an item collection may be obtained, the type of model to be trained, and/or various other parameters. In some cases, the training data set may be provided or included as a parameter of a programmatic request, instead of indicating a data source where the data set can be obtained.

One or more request handlers 150, implemented using some combination of hardware and software elements of the forecasting service, may initiate the process of training a forecasting model or forecaster based on the client's request in the depicted embodiment. In some embodiments, a particular forecasting algorithm, such as an empirical Bayesian algorithm 135 which employs a deconvolution-based procedure, may be indicated in the client's request, and the appropriate executable code and/or other artifacts needed for the training may be obtained from a forecasting algorithm library 133. In other embodiments, the client may not necessarily specify the algorithm, and the request handlers 150 or other components of the forecasting service 190 may determine that the empirical Bayesian algorithm 135 is to be used, e.g., based on the kind of problem to be solved, the contents of the data set, etc. If needed, the training data set 110 may be obtained from the data sources indicated by the client. In one embodiment, the different elements of the training data set may be obtained from different data sources—e.g., the change event records 112, may be obtained from one repository or database, the asynchronous operation records 122 may be obtained from another repository, and item category metadata may be extracted from a third source.

A forecasting model that employs the empirical Bayesian deconvolution based algorithm 135 may be trained using at least a portion of the service's model training resources 136. In some embodiments, G-deconvolution (which may sometimes be referred to as g-deconvolution) may be used in the forecasting model. The model may generate, corresponding to an item 103 whose state has changed, an estimate of a metric of at least a first type of asynchronous operation in various embodiments. Such an estimate may be based at least in part on (a) a category-level distribution of the first type of asynchronous operation, corresponding to a first category of the respective categories, (b) an item-level distribution of the first type of asynchronous operation, corresponding to the item, and (c) a category-versus-item adjustment which is used to combine the category-level information with the item-level information in the depicted embodiment. The item-level distribution and/or the category-level distribution may themselves be estimated or learned within the model in various embodiments. Generally speaking, the more information there is in the training data set 110 about events in which different instances of a given item changed state, and about asynchronous events (related to the given item) of the first type that were later or earlier recorded, the more importance the item-level information may be granted relative to the category-level information when generating the output of the model. The category-versus-item adjustment of the model for a given item may be based on various factors in different embodiments, including for example the number of records of events associated with that item that are included in the training data set (different items may have differing numbers of state change records and/or asynchronous operation records in the training data available), dispersion metrics of the item-level distributions and/or the category-level distributions, and so on.

After the training is completed, a trained version 140 of the forecasting model may be stored in various embodiments, e.g., at an artifact repository of the forecasting service. When a client 195 issues a forecasting request via a programmatic interface 170, the trained version 140 of the model may be executed, using model execution resources 145, to generate one or more estimated metrics 165 of asynchronous operations corresponding to an item indicated in the request in the depicted embodiment. For example, in one embodiment the trained model may generate, corresponding to a given item that was purchased from an online retailer, an estimated forecast of the number of one or more types of customer support interactions (e.g., telephone calls, e-mails, text messages, etc.) that may be expected within a month after the purchase, an estimate of the probability that the item will be returned to the retailer, etc.

The forecast metrics 165 of the asynchronous operations may be provided to any of several types of destinations in the depicted embodiment. For example, the metrics may be presented, e.g., via one of the programmatic interfaces 170, to the client 195 on whose behalf the metrics were generated in some embodiments. In at least some embodiments, the forecasts may be provided to one or more decision support engines 177, which may be implemented using one or more computing devices. The decision support engines 177 may produce recommendations for one or more actions 171 to be performed with respect to the item/entity collection 102 in at least some embodiments, and provide the recommendations to one or more forecast-based action initiators. Such actions may, for example, include modifying collateral information (e.g., customer support information available online), changing packaging of future shipments of some items (e.g., to reduce damage or return probabilities), removing an item from the item collection, changing prices of some items, etc. In at least one embodiment, the forecasts may be provided directly to automated forecast-based action initiators 167 implemented at one or more computing devices, and decision support engines may not be used.

Underlying Mathematical Framework

In at least some embodiments, the mathematics underlying a forecasting approach similar to that introduced above may be summarized as follows. An assumption may be made that each item of the item collection for which forecasts of asynchronous operations are to be generated represents an independent measurement unit. The count of occurrences of a type of asynchronous operation (such as the number of customer service interactions, in an example scenario where the state change records may indicate sales/shipments of an item or items) may be represented as a random variable following a Poisson distribution, with the "true" (expected value) count of occurrences as the rate parameter. In an empirical Bayesian technique employed in various embodiments, the Poisson rates for the individual measurement units are latent model parameters (that is, the corresponding values cannot be directly measured), which in turn are assumed to be sample realizations from some unknown "prior" distribution. This unknown prior distribution may be estimated from the historical data available (including category-level data of one or more categories to which the item belongs) using a version of a G-deconvolution algorithm (e.g., a version that is enhanced to handle the case where different measurement units have different exposures) in at least one embodiment. After the prior distribution is estimated, an estimate for the targeted type of asynchronous operation (that is, equivalently, the estimate of the forecast) may be obtained by evaluating the posterior mean, e.g., from the empirical likelihood from the historical data along with the estimated prior using Bayes rule. Examples of the kinds of equations that may be employed in some embodiments are provided below.

With respect to the $i^{th}$ item of the item collection, in some embodiments, the formula shown in Equation (1) may represent a random variable $X_i \in \mathbb{R}^+$ corresponding to the occurrences of asynchronous operations of a particular type associated with the item:

$$X_i \sim (1/c_i)\text{Pois}(c_i\theta_i) \qquad \text{Equation (1)}$$

In Equation (1), $c_i$ is the exposure (the number of records in the training data set representing state changes of the $i^{th}$ item, such as the number of shipment or sales transactions involving the item) and $\theta_i$ is the Poisson rate of the distribution corresponding to the $i^{th}$ item. Note that the random variable $Y_i = c_i X_i$ then has the distribution $Y_i \sim \text{Pois}(\lambda_i)$ where $\lambda_i = c_i \theta_i$, with density function $p(Y_i) = \exp(-\lambda_i)\lambda_i^{y_i}/y_i!$, where $y_i$ takes non-negative integer values. The corresponding density function $p(X_i)$ can be written as $p(x|\theta;c)$ where x denotes the range of values for the random variable $X_i$, and in which the functional dependency on the (typically unknown) rate parameter $\theta$ (where $\theta \geq 0$) and (typically known) exposure c is now explicit. The function $p(x|\theta;c)$ is termed the likelihood function.

Let $p(x|\theta;c)$ be the likelihood function, and let $g(\theta)$ be the prior density for $\theta$, with $\theta \in \mathbb{R}^+$. The marginal density $f(x;c)$ is given by Equation (2):

$$f(x;c) = \int_{\theta=0} p(x|\theta;c)g(\theta)d\theta \qquad \text{Equation (2)}$$

To reiterate from the preceding discussion, the form of likelihood function $p(x|\theta;c)$ of Equation (2) is known, whereas the form of the prior density $g(\theta)$ is unknown, and cannot be directly estimated since the values of $\theta$ are not observed. Knowledge of the prior density $g(\theta)$ makes it possible to obtain predictive parameter estimates and forecasts given the observed data for the random variable $X_i$ using Bayes rule, i.e., by evaluating the posterior density $p(\theta_i/X_i; c_i) = p(X_i|\theta_i; c_i)g(\theta_i)/f(X_i; c_i)$.

The empirical Bayes approach uses the observational data $\{X_i\}$ for the individual items for $i=1$ to n, which are considered as independent observations from the marginal density $f(x;c)$ in Equation (2), in order to estimate the unknown prior density $g(\theta)$. This estimation process is a deconvolution, which is best illustrated by considering a simplified and familiar example that is the equivalent of Equation (2). Here, in this example, the variable exposure term $c_i$ is omitted (or equivalently set to a constant so that it is the same for all measurement units), and the Poisson likelihood function for $p(x|\theta; c)$ is replaced by a Gaussian with mean $\theta$ (where $-\infty \leq \theta \leq \infty$) and variance 1 (unit variance). The marginal density in this case equivalent to Equation 2 above is then given by $f(x) = \int_\theta \varphi(x-\theta)g(\theta)d\theta$, so that with this simplification the density $f(x)$ is readily seen to be the convolution of the known Gaussian density $\varphi(x) = (2\pi)^{-1/2}e^{-x^2/2}$ with the unknown density $g(\theta)$. In practical terms, it is not possible to estimate the unknown prior distribution $g(\theta)$ directly since $\theta$ is not an observable quantity. Therefore, the density $f(x)$ is first estimated from the observational data $\{X_i\}$ for $i=1$ to n, and this estimated density for $f(x)$ is then deconvolved (which can be regarded as the "inverse" of the convolution just described above) to obtain a corresponding estimate of $g(\theta)$.

According to some embodiments, the specific g-deconvolution algorithm described below may be employed to estimate $g(\theta)$. This is termed a non-parametric approach because it does not assume a specific parametric form for $g(\theta)$ (an example of such a specific parametric form in this case might be a Gamma distribution with unknown hyperparameters, since it would at least be consistent with the range restriction that the values of $\theta$ must be non-negative; the term "hyperparameters" here refers to parameters of the assumed specific parametric form for $g(\theta)$). The specific g-deconvolution algorithm described below uses a non-parametric form for $g(\theta)$ that has the useful property that it does not constrain the estimated density $g(\theta)$ to be unimodal (a density function is unimodal if it only has a single peak, e.g., the density function for the Gaussian distribution is unimodal, while the density for a mixture of well-separated Gaussians may be regarded as multi-modal). The following derivation focuses on the description of a g-deconvolution algorithm which may be used in some embodiments, in particular focusing on the "variable exposure" case.

Let $\{\theta_{(1)}, \theta_{(2)}, \ldots, \theta_{(m)}\}$ denote the discretization of $\theta$, so that the equivalent discretized version of Equation (2) is given by Equation (3):

$$f(X_i, c_i) = \Sigma_{l=1,m} P_{l;i}(c_i) g_l \qquad \text{Equation (3)}$$

In Equation (3), by definition, $\Sigma_{l=i,m} g_l = 1$ and $P_{l;i}(c_i)$ may be evaluated by numerical integration. Note that if one assumes that all the observations have the same exposure (a simplifying assumption that need not be made in at least some embodiments), the range of $X_i$ can also be discretized, which may lead to some computational savings in the estimation procedure. However, such an assumption may not be valid, and may therefore not be used, for at least some training data sets in various embodiments.

With this discretization, the marginal likelihood of $\{X_i\} i=1$, n may be expressed using Equation (4):

$$\Sigma_{i=1,n} \log f(X_i, c_i) = \Sigma_{i=1,n} \log(\Sigma_{l=1,m} P_{l;i}(c_i) g_l) \qquad \text{Equation (4)}$$

Now consider the formulation for $g_l$ in Equation (5):

$$g_l = \exp(\gamma_l^T \alpha) / \Sigma_{l'=1,m} \exp(\gamma_{l'}^T \alpha) \qquad \text{Equation (5)}$$

Equation (5) represents $g(\theta)$ in terms of a distribution from the exponential family of distributions (this exponential family of distributions represents a set of distributions that has some useful properties for regression applications, in particular for generalized linear models, or GLMs; while this family includes many well-known parametric distributions such as the Gaussian, a specific non-parametric form described next may be used in some embodiments). Specifically, in Equation (5), $\gamma_1$ for $l=1, \ldots, m$, denotes the $l^{th}$ row of the (known) design matrix of a normalized spline basis on the support of $\theta$. Similarly, $\alpha$ denotes the p-dimensional vector of coefficients to be estimated from the data using maximum marginal likelihood. A regularization term proportional to the 2-norm, e.g., $C\|\alpha\|^2$ may be added to the marginal log-likelihood function in Equation (4) to prevent overfitting in some embodiments. A default value of $C=1$ may be used in some implementations. In other implementations, optimal cross-validation estimates of C may be obtained. In at least one embodiment, the estimation procedure may utilize a function or routine similar to the nonlinear optimization routine nlm of the R statistical computing environment, and may include obtaining analytical derivatives. By evaluating the posterior mean, using the likelihood and the estimated prior, the final estimate for the asynchronous operations (which may be referred to as a "shrinkage" estimate) may be obtained in various embodiments. In at least some embodiments, the entire posterior distribution may be obtained, which may be used to obtain posterior confidence intervals as well. Note that at least some details of the example mathematical framework provided here may not necessarily apply in one or more embodiments—e.g., variants of one or more of the Equations (1)-(5) may be used.

Examples of Asynchronous Operations

Figure 2:
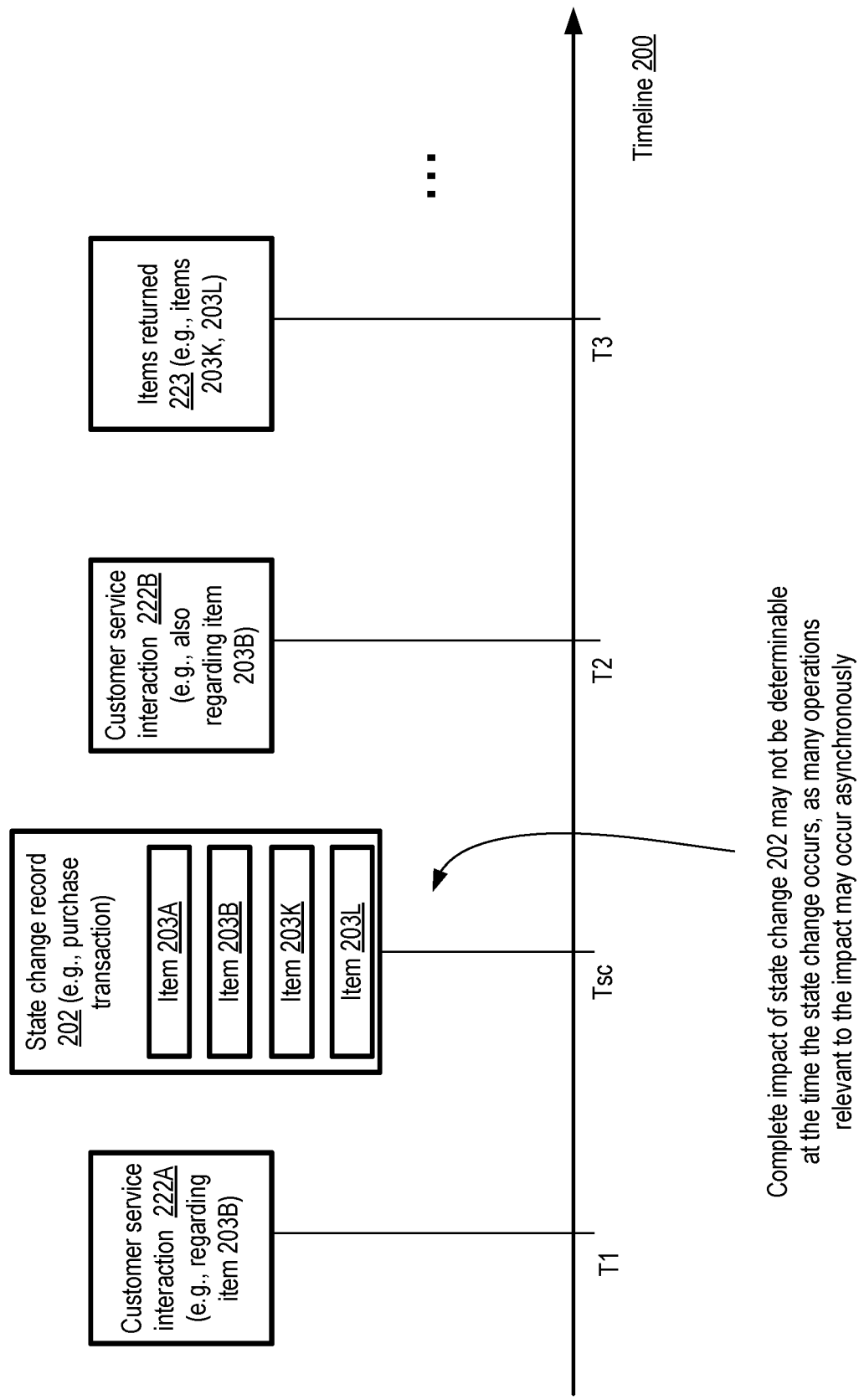
FIG. 2 illustrates an example timeline of a state change record and associated asynchronous operations for which forecasts may be obtained, according to at least some embodiments.

FIG. 2 illustrates an example timeline of a state change record and associated asynchronous operations for which forecasts may be obtained, according to at least some embodiments. In the depicted example, a state change record 202 may indicate a purchase transaction in which instances or examples of four items 203A, 203B, 203K and 203L of an item collection were purchased at a time Tsc along timeline 200.

At some earlier time T1, a first customer service interaction 222A, e.g., a query via a text-message or email, pertaining to one of the items (203B) may have occurred in the depicted example. At some time T2 after Tsc, another customer service interaction 223B (e.g., a request for usage clarification) may occur, also about item 203B. At some later time T3, the purchaser may return a subset of the items purchased, such as 203K and 203L, as indicated in event 223. The complete impact of the state change represented by record 202, e.g., on the organization in responsible for the item collection, may be difficult to determine at (or even shortly after) the time Tsc at which the state change occurs. For some types of items and state change events, asynchronous operations such as customer support interactions may continue to occur for weeks, months or even years, and the cumulative impact of such asynchronous operations may be non-trivial. Using forecasting methodologies similar to those introduced above, in at least some embodiments, data-driven estimated metrics of asynchronous events of various types may be generated. Such forecasts may then be used to implement actions that may, for example, lead to desired reductions in asynchronous operation counts in the long run, or preferred changes in the types of asynchronous events that do occur.

Varying Amount of Available Item-Level Information

Figure 3:
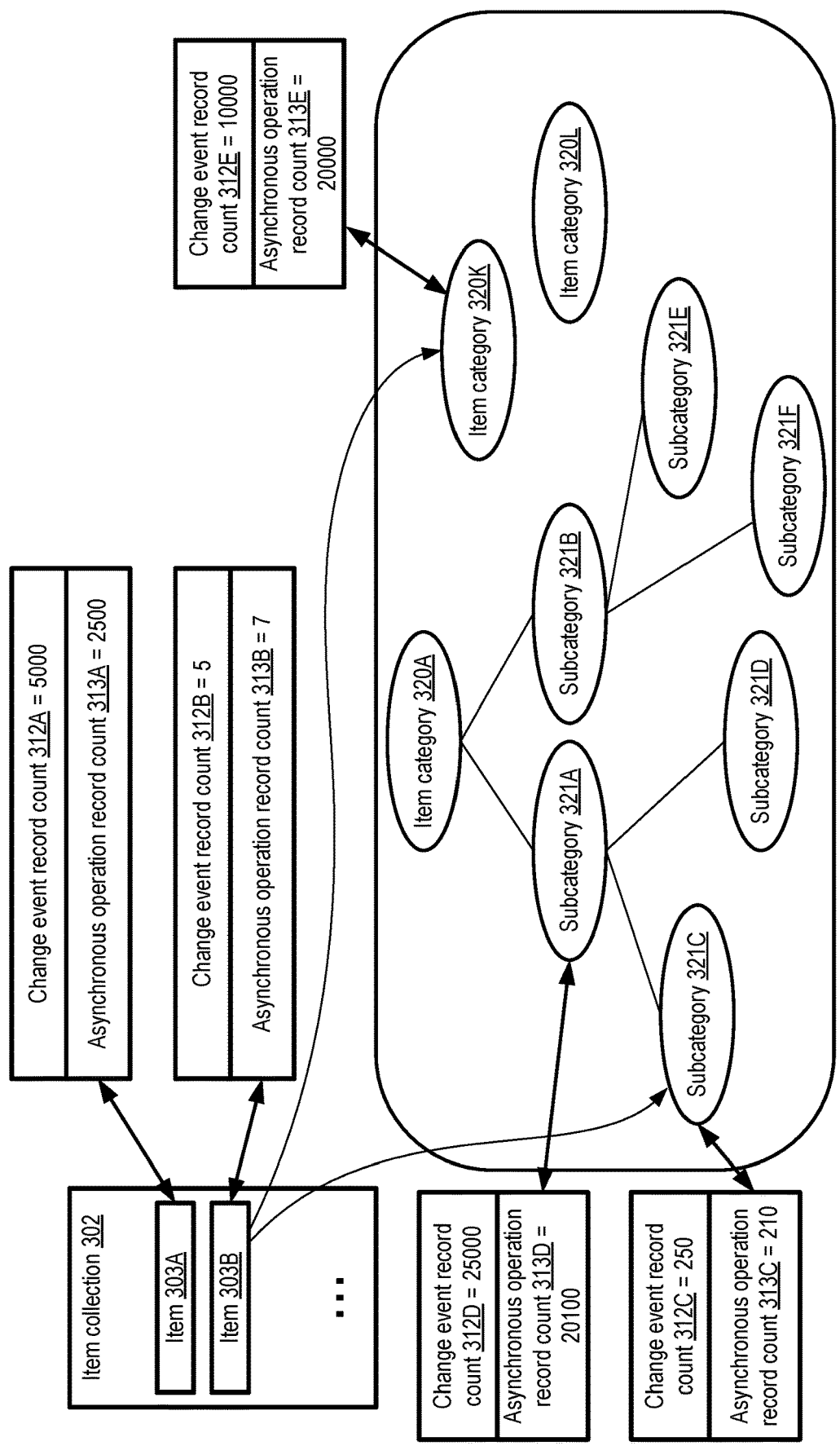
FIG. 3 illustrates examples of differences in the number of available examples of change events and asynchronous operation records pertaining to individual items and item categories of an item collection, according to at least some embodiments.

The amount of information available in a training data set for different items, item categories, and associated asynchronous operations may vary widely. Such differences may be taken into account in the deconvolution-based empirical Bayesian algorithm used for generating forecasts of asynchronous operation metrics in various embodiments. FIG. 3 illustrates examples of differences in the number of available examples of change events and asynchronous operation records pertaining to individual items and item categories of an item collection, according to at least some embodiments. In the depicted embodiment, forecasts regarding asynchronous operations related to items 303 of an item collection 302 may be generated using an empirical Bayesian model similar to those discussed above in the context of FIG. 1.

With respect to individual ones of the items 303, three types of input data may be used in the training of the forecasting model in the depicted embodiment: change event records that represent state changes of one or more item each, asynchronous operation records associated with one or more items each, and information indicating one or more categories to which individual items belong. A given item 303 may belong to a plurality of categories in the depicted embodiment. A hierarchy or tree of categories may be defined for at least some items, e.g., with a root item category such as 320A, and several levels of child sub-categories such as 321A-321F. Some item categories may not necessarily belong to a hierarchy, such as category 320K or 320L. In some embodiments, information regarding the particular categories or sub-categories to which a given item 303 belongs may be included in the training data set. In other embodiments, The number of examples, e.g., of state change records pertaining to a particular item, or of asynchronous operations related to such state change events, may differ widely for different items in various embodiments. Thus, for example, in the scenario depicted in FIG. 3, the state change event record count 312A corresponding to item 303A in a training given data set may be 5000, and the asynchronous operation record count 313A for item 303A may be 2500.

Meanwhile, the state change event record count 312B for item 303A may be 5 (e.g., in a scenario in which the state change events represent purchases from an e-retailer, only 5 separate purchases of instances of item 303B may have occurred during the period over which the training data set was collected), and the count 313B of asynchronous operation records may be 7 (e.g., only 7 customer service interactions may have been recorded pertaining to item 303B in the same period). As such, because the number of examples pertaining to item 303B is so low relative to the number of examples pertaining to item 303A, when generating forecasts using an empirical Bayesian model, information about categories to which item 303B may be granted a higher relative weight than information about categories to which item 303A belongs in at least some embodiments.

As indicated in FIG. 3, item 303B may belong to a leaf-level subcategory 321C of a category hierarchy rooted at category 320A, and may also belong to category 320K, which is not part of the hierarchy. The available change record count 312C for all items of subcategory 321C may be 250, and the asynchronous operation record count 313C may be 210. In some embodiments, these counts may not be sufficient for the forecasting model, so higher-level subcategories of the hierarchy may be taken into account—e.g., subcategory 321A has an aggregate change event record count of 25000 and an aggregate asynchronous operation record count of 20100, which may lead to the use of information for the subcategory 321A for making predictions/forecasts of asynchronous operations related to item 303A (in preference to using information about subcategory 321C, which has far fewer examples). In some cases, instead of or in addition to using hierarchical category information, information about standalone categories such as 320K (which has an aggregated change event record count 312E of 10000 and an aggregated asynchronous operation record count 313E of 20000) may be used in the forecasting model.

Example Distribution Combining Category and Item Level Information

Figure 4:
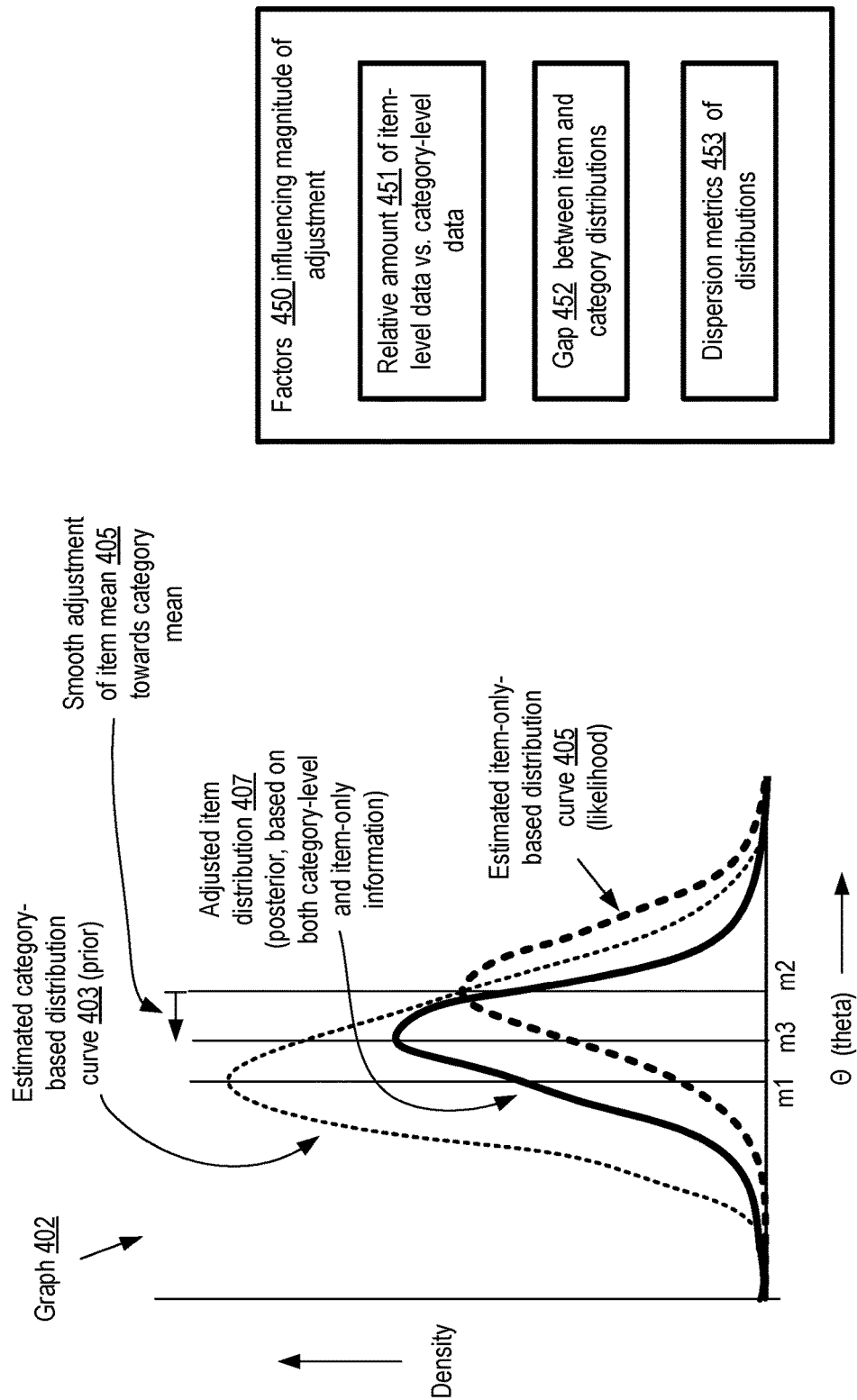
FIG. 4 illustrates an example of an adjusted distribution obtained from an empirical Bayesian forecaster using an estimated item-level distribution and a category-based distribution, according to at least some embodiments.

FIG. 4 illustrates an example of an adjusted distribution obtained from an empirical Bayesian forecaster using an estimated item-level distribution and a category-based distribution, according to at least some embodiments. In graph 402, respective example plots of three density curves for $\theta$ (corresponding to the $g(\theta)$ terms introduced in the mathematical summary above) are shown. Note that these curves are shown to illustrate, at a high level, the kinds of analysis performed by an empirical Bayesian deconvolution based forecasting model of the kind discussed above (e.g., in the context of FIG. 1) and to indicate the manner in which category-level information may be combined with item-level information in such models, and is not intended to represent actual results pertaining to any specific test data set or any specific item.

Curve 403 represents an estimated category-based distribution (the "prior" distribution in mathematical terms) in the depicted embodiment, summarizing information obtained from a peer group of the item, with a peak (or mean) at a $\theta$ value of m1. Curve 405 is the item-only based distribution curve, with a peak/mean (corresponding to a maximum likelihood) at m2. Curve 405 may be referred to as the likelihood curve in some embodiments. Informally, in the depicted scenario, based on the analysis of the information available at the item level, a higher mean value or likelihood for $\theta$ (e.g., representing a higher count of a particular type of asynchronous event) may be predicted than if only the category level information were taken into account. The empirical Bayesian algorithm employed in at least some embodiments may take both sources of information into account, and generate an adjusted item-level distribution 407 whose peak (at m3) falls somewhere between the peaks of the other two curves. The adjusted distribution may be referred to as the "posterior" distribution in at least some embodiments, which summarizes/combines information from the item and its category or peer-group. The adjustment 405 (shown as a difference in peak values in FIG. 4) may be smooth in at least some embodiments, in that, if less item-level information is available, the adjusted curve may shift more towards the category-level information, and as more item level information becomes available the adjusted curve may approach the item-level curve. In at least some embodiments, the point estimate (e.g., m3) corresponding to the mean of the adjusted distribution may be used in further analysis, e.g., to initiate actions of the types discussed in the context of FIG. 1.

Several factors 450 may influence the magnitude of the adjustment (e.g., the extent of the shift towards the category-level curve) made in the empirical Bayesian forecasting model in various embodiments. Such factors may, for example, include the relative amount of data 451 (e.g., number of event records, number of asynchronous operation records, etc.) available in the training data set at the item level versus the category level, the gap 452 or distance between the item and category distributions (e.g., as reflected by the peaks of the distribution curves such as 405 and 403), and/or the dispersion metrics 453 or variability characteristics of the distributions. With respect to dispersion metrics, for example, other things being equal, the forecasting algorithm may in at least some embodiments assign a greater importance or weight to a distribution with a lower variance or standard deviation than to one with a higher variance or standard deviation. In particular, a likelihood with low dispersion (e.g., a low standard deviation) may indicate a relatively large amount available information in various embodiments, typically because there is more historical data available for the item, and a likelihood with high dispersion (e.g., a high standard deviation) may indicate a small amount of available information, typically because there is only a small set of historical data for the item.

Example Multi-Modal Behavior of Category-Level Information

In the example shown in FIG. 4, the curve 403 representing the category-level information had a single peak. In some cases, however, the manner in which items get categorized may result in multi-modal or multi-peak category-level ("prior") distributions, which in turn may make the category-versus-item adjustments of the forecasting model somewhat more complex than in the single-mode or single-peak scenario. Multi-modal priors may result, for example, in scenarios in which items are categorized from a perspective which does not truly represent homogeneity with respect to the types of asynchronous operations being considered. In the case where the items represent products of an e-retailer's online catalog, for example, for historical reasons categories may be based on traditional retail shopping hierarchies in some embodiments, and when considering customer support interactions as an asynchronous operation type of interest, categories and sub-categories defined in the traditional retail hierarchies may not necessarily accurately reflect similarities in customer support interactions when the items are sold via online channels instead of traditional retail channels.

Figure 5:
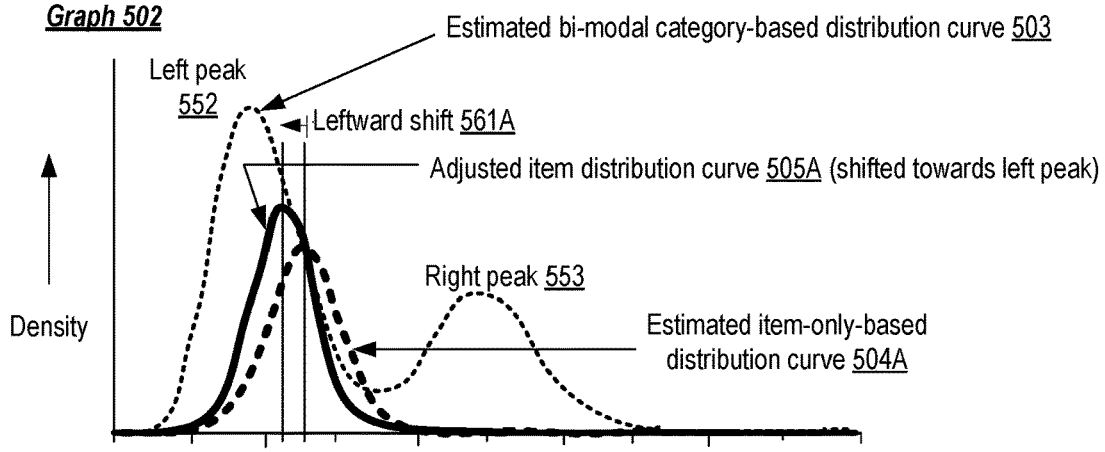
FIG. 5 illustrates examples of shifts of item-level estimates in a scenario in which a category-level distribution is bi-modal, according to at least some embodiments
Figure 5:
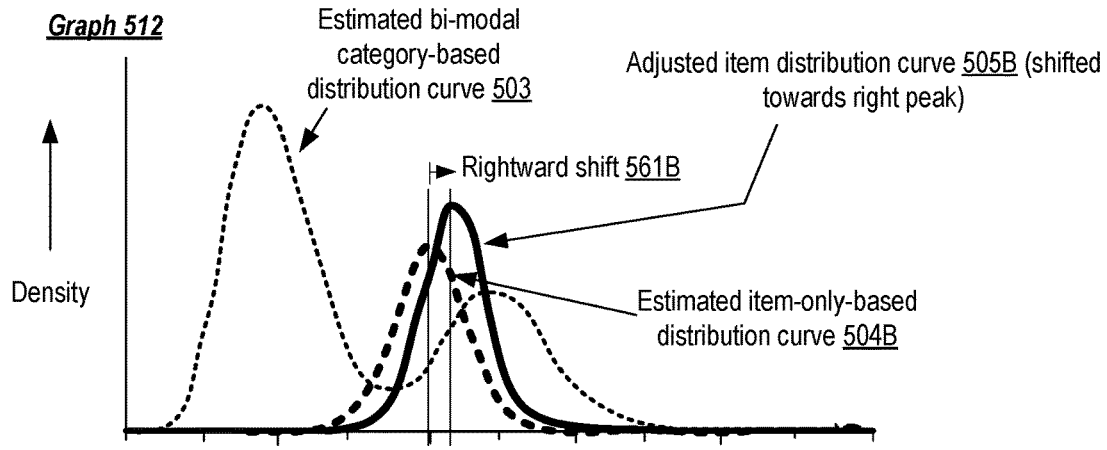
Figure 5:
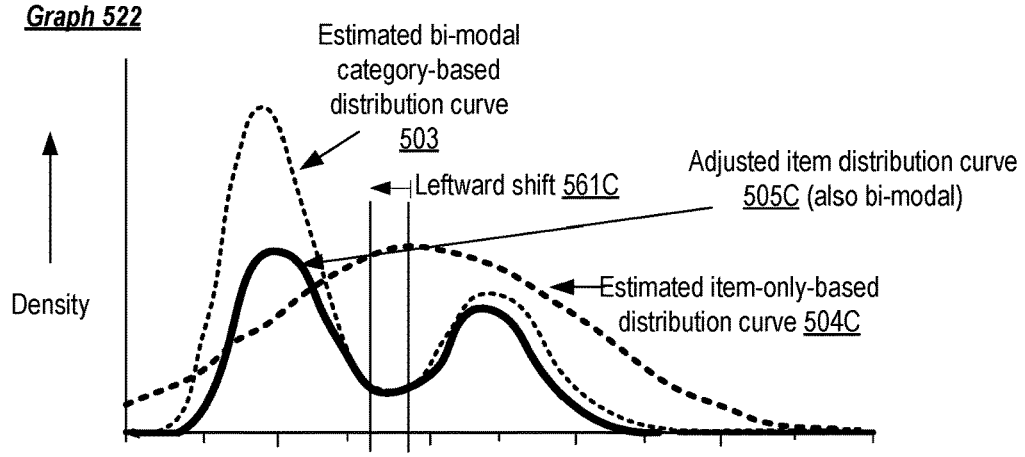

FIG. 5 illustrates examples of shifts of item-level estimates in a scenario in which a category-level distribution is bi-modal, according to at least some embodiments. As in the case of FIG. 4, the graphs 502, 512 and 522 of FIG. 5 are presented to illustrate some characteristics of the forecasting methodology being employed, and are not intended to represent an actual real-world data set. As indicated in the examples, in at least some embodiments in which a category-level distribution is multi-modal and has several peaks, the category-versus-unit adjustment of the empirical Bayesian model may shift its output estimate towards a particular peak.

In each of example graphs 502, 512 and 522 of FIG. 5, an identical bi-modal category-based prior distribution curve 503 is shown. This curve has two clearly defined peaks or local maxima—a left peak 552 and a right peak 553. This may suggest that the items belonging to the category being considered could potentially be grouped into at least two more homogeneous sub-groups, at least in principle; that is, that the peer group represented by the category contains two subpopulations with different behavior. In graph 502, the dispersion or variation indicated by curve 504A is not very extreme (e.g., the standard deviation corresponding to curve 504A is not very high), and the item-only-based distribution curve 504A lies somewhat closer to the left peak (indicating that the item is more likely to belong to the homogeneous sub-group corresponding to the left peak). Accordingly, the adjusted item distribution curve 505A for the asynchronous operation type being considered is shifted towards the left peak 552. The arrow labeled "leftward shift 561A" indicates the direction and approximate magnitude of the shift of the peak of the adjusted item distribution curve. The difference in the adjustments generated in the model in graphs 502 versus graph 512 may illustrate one key distinction between the version of the empirical Bayesian deconvolution-based technique used in some embodiments, and at least some other techniques in which the adjustment or shrinkage resulting from the inclusion of category-level information is towards a fixed constant value and is not towards a value corresponding to a selected one of multiple peaks in the prior distribution.

In graph 512, the dispersion or variation indicated by curve 504B is also not very extreme, and the item-only-based distribution curve 504B lies somewhat closer to the right peak (indicating that the item is more likely to belong to the homogeneous sub-group corresponding to the right peak). Accordingly, the adjusted item distribution curve 505B is shifted towards the right peak 512 in the depicted embodiment in the model. The arrow labeled "rightward shift 561B" indicates the direction and approximate magnitude of the shift of the peak of the adjusted item distribution curve in graph 512.

In graph 522, the item-only-based distribution curve 504C has a wider dispersion than in graphs 512 or 522. In such a scenario, the adjusted item distribution curve 505C generated by the forecasting model may also be bi-modal. This result may be interpreted, for example, as indicating that the information available about the item alone in the scenario depicted in graph 522 is too diffuse for the model to "prefer" the left peak or the right peak strongly as the one to use for the adjustment. Note that, as indicated by the arrow labeled "leftward shift 561C" in the depicted embodiment, the mean of the bi-modal adjusted item distribution curve may nevertheless be shifted slightly relative to that of the item-only curve. Comparison of graph 522 with graphs 502 and 512 shows that the item-only estimate may be shifted towards one of the peaks of the prior distribution in some embodiments, e.g., depending at least in part on the dispersion of the likelihood, i.e., on the amount of information available for the item of interest. This also represents an example of different behavior from some other techniques, where the amount of information may affect the magnitude but not the direction of the shift in the estimate. While FIG. 5 illustrates bi-modal distributions by way of example, in various embodiments non-parametric deconvolution based forecasting techniques similar to those described above may be employed with equal success to handle scenarios in which the distributions happen to be multi-modal with more than two modes (e.g., with three or more peaks).

Example Programmatic Interactions

Figure 6:
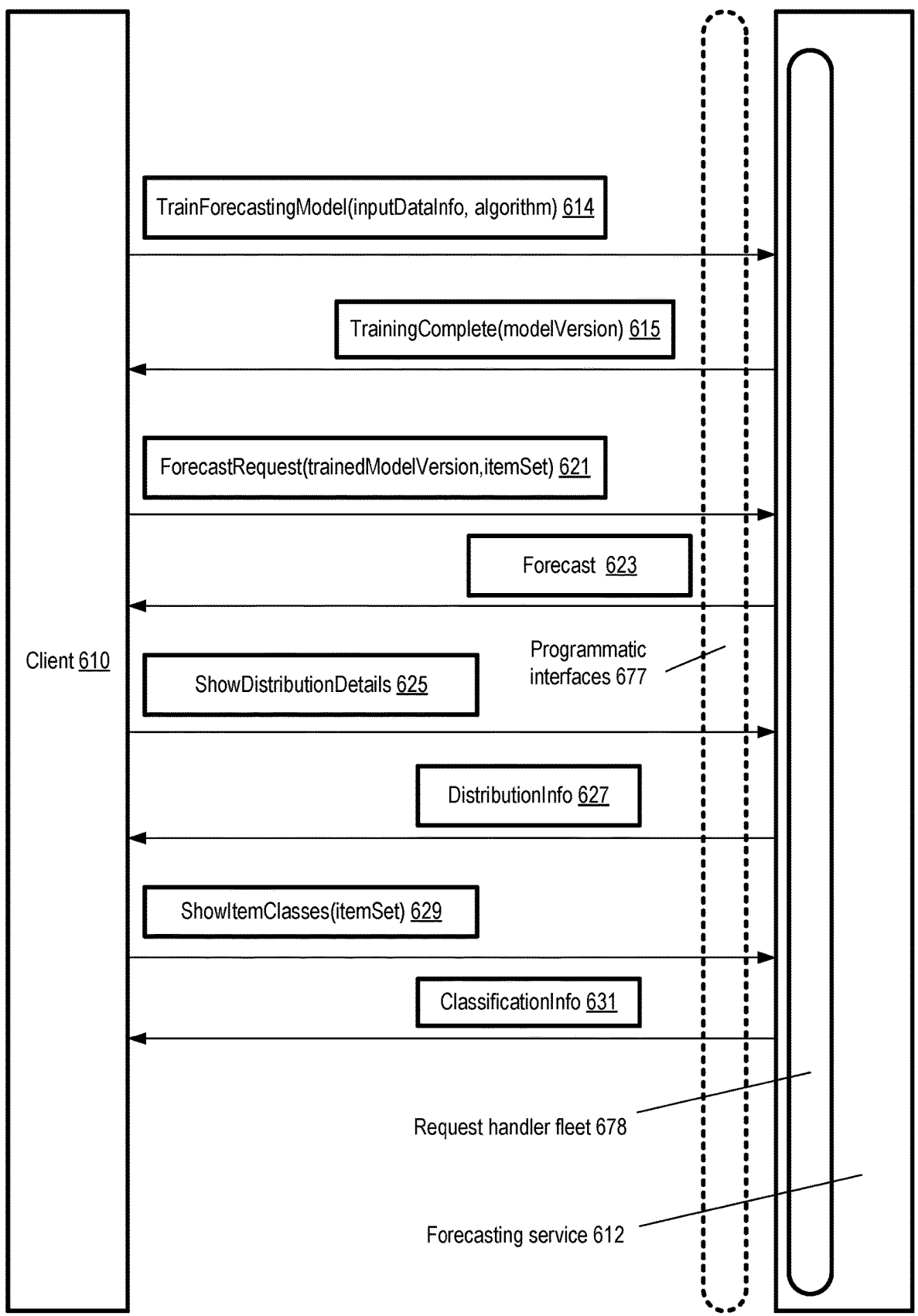
FIG. 6 illustrates example programmatic interactions between clients and a forecasting service at which empirical Bayesian models may be trained and executed, according to at least some embodiments.

FIG. 6 illustrates example programmatic interactions between clients and a forecasting service at which empirical Bayesian models may be trained and executed, according to at least some embodiments. As shown, a network-accessible forecasting service 612 (similar in features and functionality of the forecasting service 190 of FIG. 1) may implement a set of programmatic interfaces 677 in the depicted embodiment, which may be used by clients 610 to submit requests and receive responses. The programmatic interfaces 677 may include, for example, one or more web-based consoles, a set of application programming interfaces (APIs), command line tools, graphical user interfaces and the like.

Using the programmatic interfaces 677, a client 610 may submit a TrainForecastingModel request 614 to initiate the training of a forecasting model in various embodiments. In some embodiments, the request 614 may include, e.g., in the form of an inputDataInfo parameter, an indication of one or more sources from which portions or all of the training data may be obtained. In one embodiment, the input data sets may be included as a parameter, e.g., instead of indicating data sources from which the input data can be obtained. In at least one embodiment, a client may optionally indicate a preferred algorithm (e.g., via the algorithm parameter), such as an empirical Bayesian algorithm that utilizes deconvolution, to be used for the forecasting model. In other embodiments, the forecasting service 612 may select the algorithm.

The training request 614 may be received at a request handler fleet 678 implemented at one or more computing devices of the forecasting service 612 in various embodiments. The model may be trained using training resources of the forecasting service 612 that have been assigned/allocated in response to the request 614, and the trained version may be stored at a repository of the forecasting service 612. After the training is complete, in some embodiments a message 615 indicating that a trained version of the model (e.g., identified by the parameter modelVersion) is ready for execution may be transmitted to the client 610. Note that at least in some embodiments, it may take a while to complete the training, so the TrainingComplete message 615 may not be sent immediately or synchronously with respect to the TrainForecastingModel request 614. In one embodiment, instead of receiving a TrainingComplete response to a training request, a client 610 may poll or query the forecasting service (e.g., periodically) to determine the status of the model being trained. In some embodiments, respective models may be trained for individual types of asynchronous operations, while in other embodiments, a single model that can forecast metrics for several different types of asynchronous operations may be trained. In at least some embodiments, new versions of the model may be trained (or re-trained) periodically as new input records become available—e.g., once a week, a new version may be generated using data collected over the prior W weeks.

A client 610 may submit forecast requests 621 for metrics of asynchronous operations corresponding to one or more data items via the programmatic interfaces 677 in the depicted embodiment. Such requests may, for example, indicate the specific version (e.g., using the trainedModelVersion parameter) of the model that is to be used to generate the forecast, as well as the set of items (itemSet) for which forecasts are to be generated. In some embodiments, the particular type of asynchronous operation for which metrics are to be forecast may be indicated in the forecast request. Forecast requests 621 may be submitted in batch mode, e.g., for a large number of items using a single request in some embodiments, and/or in real-time or point mode, in which a forecast pertaining to a single item may be submitted. The trained version of the model may be executed at execution platforms allocated/assigned to the request 621, and the results may be provided to the client 610 in one or more forecast messages 623 in the depicted embodiment.

In at least some embodiments, a client 610 may be able to view or obtain various details regarding forecasting models generated on the client's behalf. For example, in some embodiments a client 610 may wish to view distribution details (e.g., prior, likelihood and/or posterior distribution curves of the kind shown in FIG. 4 or FIG. 5), so as to obtain a better intuitive understanding of the data and the computations generated by the model. A ShowDistributionDetails message 625 may accordingly be submitted via the programmatic interfaces 677 in at least some embodiments. In response, in at least some embodiments the forecasting service may transmit a set of data usable for generating a graphical view, at a client device, of the distributions for which details were requested, e.g., in the form of a DistributionInfo message 627. In some embodiments, instead of or in addition to a graphical view, the raw data corresponding to the distribution(s) may be provided. In some embodiments, a client 610 may submit a ShowItemClasses request 629, indicating a set of one or more items for which class or category information is to be provided by the forecasting service. Such classification information may also help, in at least some embodiments, to explain the conclusions reached at the forecasting service regarding one or more types of asynchronous operations pertaining to a given item. In response, in at least one embodiment, the forecasting service may transmit a ClassificationInfo message 631, indicating the peer groups of various items for which information was requested. It is noted that in at least some embodiments, other types of programmatic requests than those shown in FIG. 6 may be submitted to the forecasting service, and corresponding responses may be provided to clients.

Example Provider Network Environment

Figure 7:
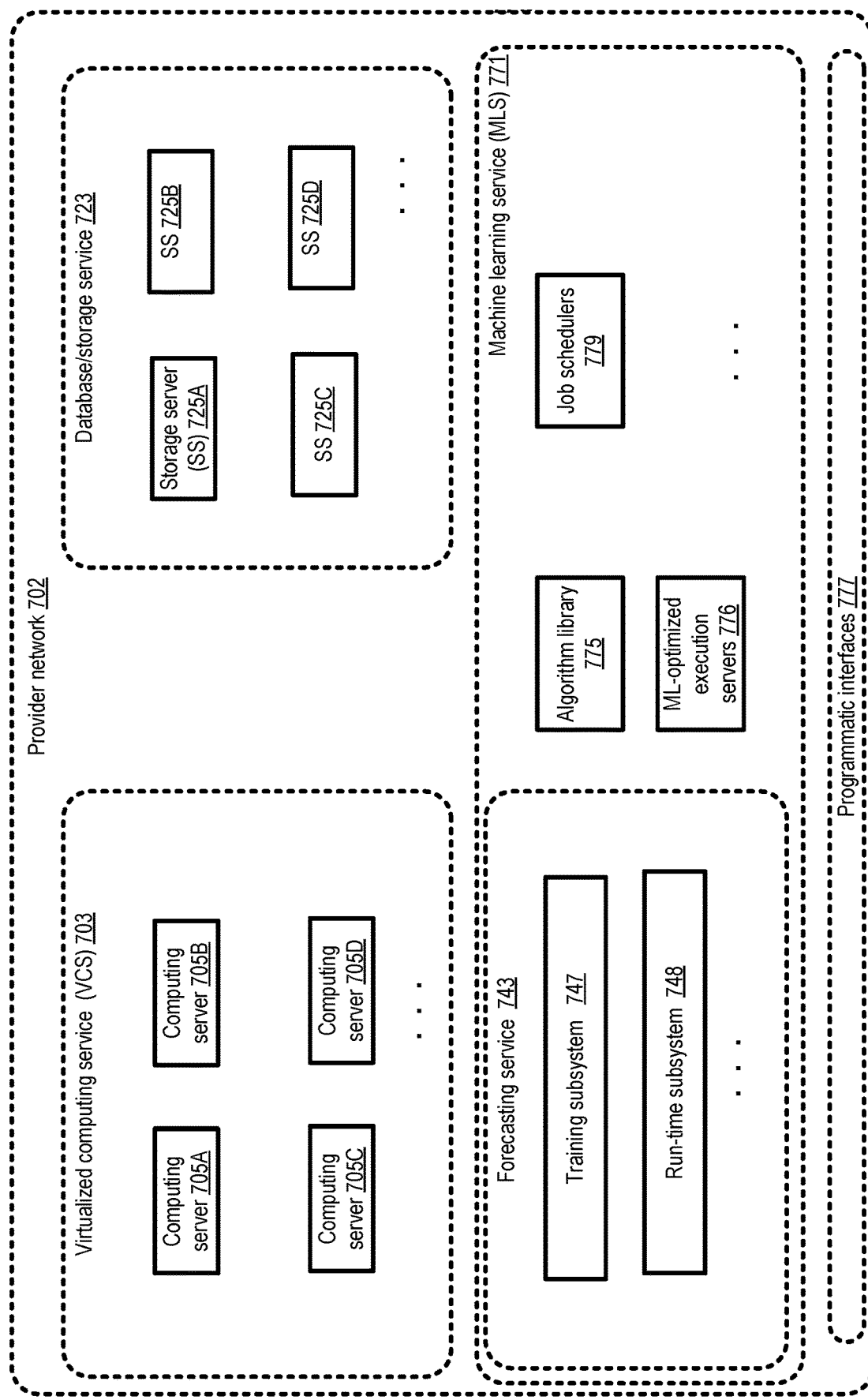
FIG. 7 illustrates an example provider network at which a forecasting service may be implemented, according to at least some embodiments.

FIG. 7 illustrates an example provider network at which a forecasting service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

The services implemented at provider network 702 in the depicted embodiment may include, for example, a virtual computing service (VCS) 703, a database/storage service 723, a forecasting service 743 and a machine learning service 771. The forecasting service 743 may have features and capabilities similar to forecasting service 190 of FIG. 1 in the depicted embodiment. As shown, in some embodiments, the forecasting service 743 may be implemented as a part of the machine learning service 771; in other embodiments, the forecasting service 743 may be implemented as a separate service. The forecasting service 743 may comprise a training subsystem 747 and a run-time subsystem 748 in the depicted embodiment. Each of the services of provider network 702 may expose respective sets of programmatic interfaces 777 to its clients in the depicted embodiment, and some of the services may utilize resources of other services (for example, the forecasting service 743, and/or the machine learning service 771 may utilize virtual machines instantiated at the virtual computing service 703 and storage devices provided by the database/storage service 723). As such, some services of provider network 702 may act as clients of other services in various embodiments.

At the training subsystem 7047 of the forecasting service, various types of models, including Empirical Bayesian models in which deconvolution is employed, may be trained in the depicted embodiment, and the trained models may be used at the run-time subsystem 748 to generate forecasts for asynchronous operations of various types as discussed earlier. Resources from one or more other services may be used, for example, to train the models and/or to execute the trained models. For example, in various embodiments algorithms from algorithm library 775 of the machine learning service may be executed on behalf of the forecasting service 743 using a combination of computing servers 705 (e.g., 705A-705D) of the VCS 7003, input data and/or intermediate or final results may be stored using storage servers 725 (e.g., 725A-725D) of the database/storage service, and so on. Job schedulers 779 of the machine learning service 771 may schedule long-running machine learning tasks, such as the training of some types of forecasting models of the forecasting service 743 in one embodiment. In some embodiments, special execution servers 776 (e.g., servers comprising graphics processing units (GPUs) or other processors optimized specifically for machine learning) may be available at the MLS 771, and may be employed for some of the algorithms/models trained and executed by the forecasting service 743.

In some embodiments, at least some of the techniques discussed above for training and executing forecasting models may be implemented without acquiring resources of network-accessible services such as those shown in FIG. 7. For example, a standalone tool implemented at one or more computing devices which are not part of a network-accessible service may be used in some embodiments.

Methods for Generating Forecasts of Asynchronous Operations

Figure 8:
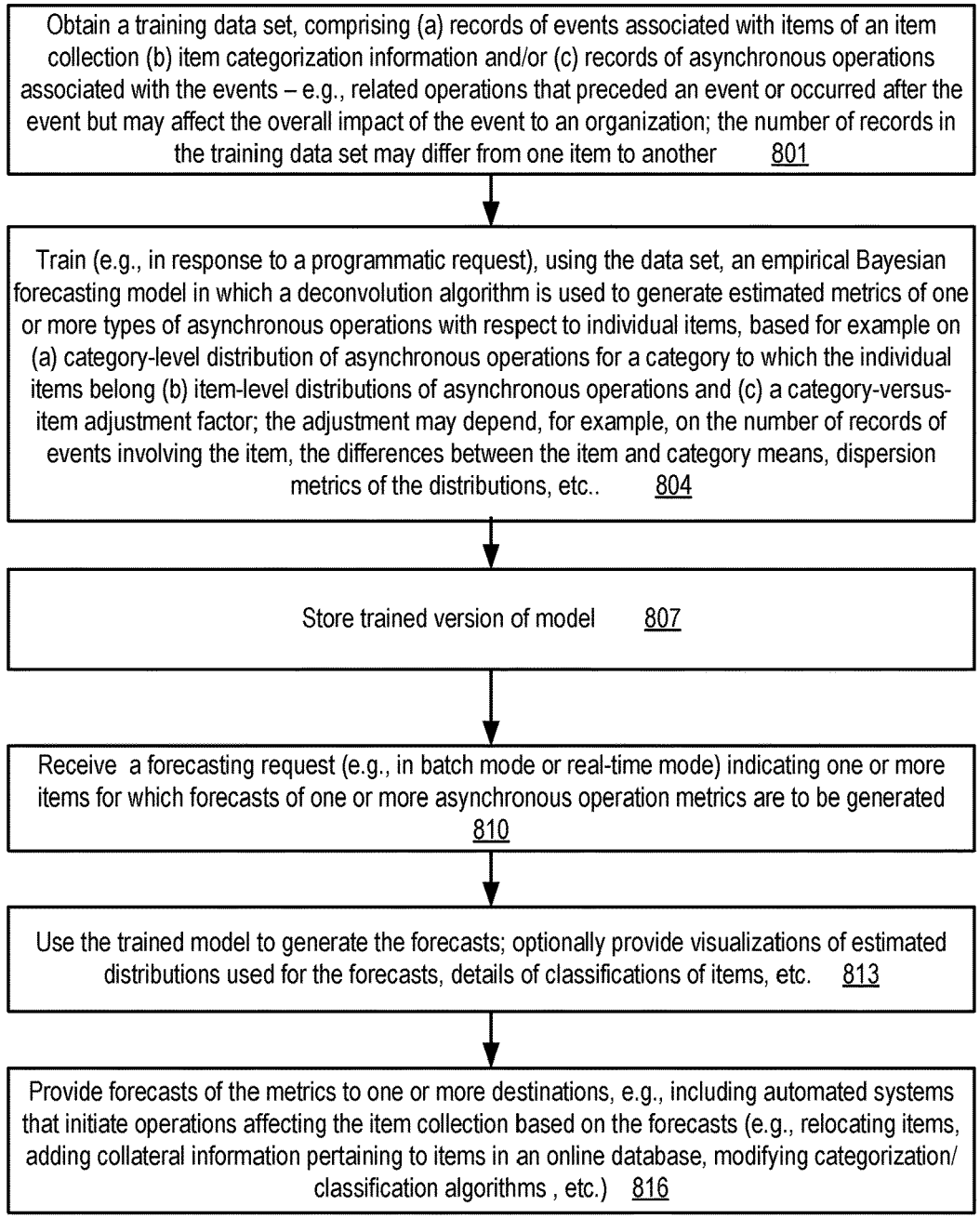
FIG. 8 is a flow diagram illustrating aspects of operations that may be performed to generate forecasts of asynchronous operations using an empirical Bayesian model, according to at least some embodiments.

FIG. 8 is a flow diagram illustrating aspects of operations that may be performed to generate forecasts of asynchronous operations using an empirical Bayesian deconvolution based model, according to at least some embodiments. As shown in element 801, a training data set may be obtained, comprising (a) records of events associated with items of an item collection (b) item categorization information and/or (c) records of asynchronous operations associated with the events—e.g., related operations that preceded an event or occurred after the event but may affect the overall impact of the event to an organization associated with the item collection. The amount of information (e.g., the number of records of events and/or asynchronous operations) available in the training data set for respective items may differ in at least some embodiments.

As shown in element 804, an empirical Bayesian forecasting model which uses a deconvolution based algorithm may be trained, using the training data set, to generate estimated metrics of one or more types of asynchronous operations with respect to individual items of the item collection in at least some embodiments. An estimates metric for a given type of asynchronous operation with respect to a given item may, for example, be based on (a) category-level distribution of asynchronous operations for a category to which the item belongs, (b) an item-level distribution of asynchronous operations associated with the item, and (c) a category-versus-item adjustment factor in various embodiments. In some embodiments, the adjustment may depend, for example, on the number of records of events involving the item, the differences between the item and category means, dispersion metrics of the distributions, and/or other measures.

A trained version of the model may be stored (element 807), e.g., at a repository of a forecasting service in one embodiment. A forecasting request may be received (element 810), indicating one or more items for which forecasts of one or more asynchronous operation metrics are to be generated in some embodiments. The forecast requests may be submitted for individual items, and/or in batch mode for groups of items. The trained version of the model may be used to generate the requested forecasts (element 813) in various embodiments. Optionally, additional information about the forecasting model, the training data set, features derived from the training data set, categorization/classification of items of the item collection for the purposes of forecasting, etc., may be provided to clients of the forecasting service via programmatic interfaces. For example, in some embodiments visualizations of distributions estimated in the model, and/or details of the classifications of various items may be provided. As shown in element 816, the generated forecasts of the metrics may be provided to one or more destinations, e.g., including automated systems that initiate operations affecting the item collection based on the forecasts. Such actions may include, for example, relocating items, adding collateral information pertaining to items in an online database, modifying categorization/classification algorithms, etc. in different embodiments.

It is noted that in various embodiments, at least some operations other than those illustrated in the flow diagram of FIG. 8 may be used to implement the forecasting-related techniques described above. Some of the operations shown may not be implemented in some embodiments or may be implemented in a different order, or in parallel rather than sequentially.

Use Cases

The techniques described above, of using an empirical Bayesian deconvolution based algorithm to generate intuitive forecasts of asynchronous operations associated with item state changes may be useful in a variety of environments. Many business organizations may manage very large dynamically changing inventories—e.g., inventories of computing systems in data centers, or inventories of items in various online catalogs. New items may be added frequently to such collections, and the counts of the records of item state changes and asynchronous operations such as customer support interactions associated with items may vary widely. As a result, it may sometimes be the case that peer-group level information may have to be relied upon to estimate various metrics of asynchronous operations. Using the Bayesian algorithm, more accurate and intuitive estimates of metrics such as the mean number of customer support calls to expect for a given item during a given future time period may be generated. Such estimates may in turn trigger actions with respect to the item collections, such as enhancing publicly available online customer support data, which can help achieve objectives such as reducing overall resource usage and costs of the organizations responsible for the item collections.

Illustrative Computer System

Figure 9:
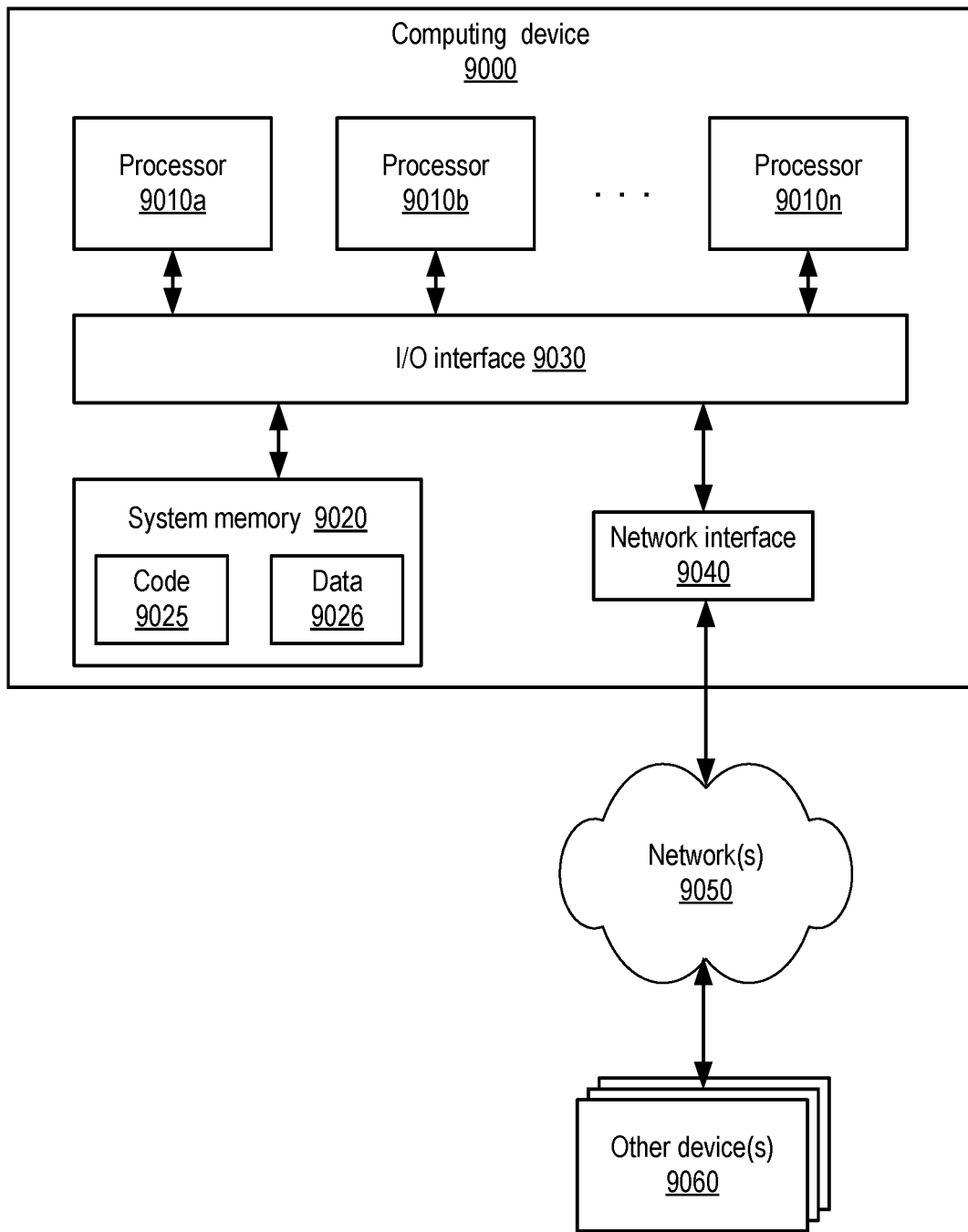
FIG. 9 is a block diagram illustrating an example computing device that may be used in at least some embodiments.

In at least some embodiments, a server that implements a portion or all of one or more of the technologies described herein, including the various components of a network-accessible forecasting service or standalone forecasting tool, may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more computing devices of a network-accessible forecasting service;
    wherein the one or more computing devices include instructions that upon execution on or across one or more processors cause the one or more computing devices to:
        obtain a training data set, comprising (a) records of a plurality of events, wherein individual ones of the events represent a state change of one or more items of an item collection, wherein at least one state change event represents a purchase transaction of an instance of an item, (b) indicators of respective categories to which individual ones of the items of the item collection belong, and (c) records of one or more types of asynchronous operations associated with at least some items of the item collection, wherein at least one type of asynchronous operation results in usage of customer support resources of an organization, wherein the item collection comprises at least a first item and a second item, and wherein, within the training data set, the number of represented state changes of the first item differs from the number of represented state changes of the second item;
        train, using the training data set, an empirical Bayesian forecasting model employing a deconvolution algorithm, wherein the empirical Bayesian forecasting model generates, corresponding to an item of the item collection whose state has changed, an estimate of a metric of a first type of asynchronous operation, wherein the estimate is based at least in part on (a) a category-level distribution of the first type of asynchronous operation, corresponding to a first category of the respective categories, (b) an item-level distribution of the first type of asynchronous operation, corresponding to the item, and (c) a category-versus-item adjustment between the category-level distribution and the item-level distribution;

store a trained version of the empirical Bayesian forecasting model;

in response to a forecasting request pertaining to at least the first item, obtain, using the trained version of the Bayesian forecasting model, a first estimated metric of a first type of asynchronous operation corresponding to the first item; and cause, based on the first estimated metric, one or more operations to be initiated with respect to at least some items of the item collection.

2. The system as recited in claim 1, wherein the category-versus-item adjustment corresponding to a particular item is based at least in part on a number of records of state change events associated with the particular item that are included in the training data set.

3. The system as recited in claim 1, wherein the category-versus-item adjustment corresponding to a particular item is based at least in part on a dispersion metric of the item-level distribution of the first type of asynchronous operation.

4. The system as recited in claim 1, wherein the category-level distribution is a multi-modal distribution with at least a first peak and a second peak, and wherein the category-versus-unit adjustment shifts the estimate of the metric of the first type towards a particular peak of the first and second peaks.

5. The system as recited in claim 1, wherein the deconvolution algorithm is non-parametric.

6. A method, comprising:

performing, by one or more computing devices:

obtaining a data set, comprising (a) records of a plurality of events, wherein individual ones of the events indicate changes to one or more items of an item collection, and (b) records of one or more types of asynchronous operations, wherein an asynchronous operation is related to one or more events of the plurality of events, wherein the item collection comprises a first item and a second item, and wherein, within the data set, the number of records indicating asynchronous operations related to state changes of the first item differs from the number of records indicating asynchronous operations related to state changes of the second item;

training, using the data set, an empirical Bayesian forecasting model employing a deconvolution algorithm, wherein the empirical Bayesian forecasting model generates, corresponding to an item of the item collection for which a record of an event is included in the data set, an estimate of a metric of a first type of asynchronous operation, wherein the estimate is based at least in part on (a) a category-level distribution of the first type of asynchronous operation, corresponding to a first category of a plurality of item categories of the item collection, (b) an item-level distribution of the first type of asynchronous operation, corresponding to the item, and (c) a category-versus-item adjustment between the category-level distribution and the item-level distribution;

storing a trained version of the empirical Bayesian forecasting model;

in response to a forecasting request pertaining to at least the first item, obtaining, using the trained version of the Bayesian forecasting model, a first estimated metric of a first type of asynchronous operation corresponding to the first item; and causing, based on the first estimated metric, one or more operations to be initiated with respect to at least some items of the item collection.

7. The method as recited in claim 6, wherein the category-versus-item adjustment corresponding to a particular item is based at least in part on a number of records of events associated with the particular item that are included in the data set.

8. The method as recited in claim 6, wherein the category-versus-item adjustment corresponding to a particular item is based at least in part on a dispersion metric of the item-level distribution of the first type of asynchronous operation.

9. The method as recited in claim 6, wherein the category-level distribution is a multi-modal distribution with at least a first peak and a second peak, and wherein the category-versus-unit adjustment shifts the estimate of the metric of the first type towards a particular peak of the first and second peaks.

10. The method as recited in claim 6, wherein the deconvolution algorithm is non-parametric.

11. The method as recited in claim 6, wherein the deconvolution algorithm is a G-deconvolution algorithm.

12. The method as recited in claim 6, further comprising performing, by the one or more computing devices:

obtaining a model training request via a programmatic interface, wherein the empirical Bayesian forecasting model is trained in response to the model training request.

13. The method as recited in claim 6, further comprising performing, by the one or more computing devices:

classifying, based at least in part on metadata corresponding to individual items of the item collection, at least some items of the item collection into one or more categories of the plurality of item categories.

14. The method as recited in claim 13, wherein the metadata comprises, with respect to a particular item, one or more of: (a) a product group, (b) a size, (c) a color, (d) a price, (e) temporal information about an occurrence of a state change event, (f) shipping information, and/or (g) information about one or more other items whose state changed in a common state change event with the particular item.

15. The method as recited in claim 6, wherein the training further comprises performing, by the one or more computing devices:

selecting, from among a plurality of item categories to which the item belongs, the first category as the category to be used to generate the estimate, wherein the selecting is based at least in part on a number of records, in the data set, of events associated with items that belong to the first category.

16. One or more non-transitory computer-accessible storage media storing program instructions that when executed on or across one or more processors cause one or more computer systems to:

obtain a data set, comprising (a) records of a plurality of state change events, wherein individual ones of the state change events represent a state change of one or more items of an item collection, and (b) records of one or more types of asynchronous operations associated with state changes of at least some items of the item collection, wherein the item collection comprises a first item and a second item, and wherein, within the data set, the number of records indicating changes to the first item differs from the number of records indicating changes to the second item;

train, using the data set, a Bayesian forecasting model employing a deconvolution algorithm, wherein the Bayesian forecasting model generates, corresponding to an item of the item collection whose state has changed, an estimate of a metric of a first type of asynchronous operation, wherein the estimate is based at least in part on (a) a category-level distribution of the first type of asynchronous operation, corresponding to a first category of a plurality of item categories of the item collection, (b) an item-level distribution of the first type of asynchronous operation, corresponding to the item, and (c) a category-versus-item adjustment between the category-level distribution and the item-level distribution;

store a trained version of the Bayesian forecasting model;

in response to a forecasting request pertaining to at least the first item, obtain, using the trained version of the Bayesian forecasting model, a first estimated metric of a first type of asynchronous operation corresponding to the first item; and cause, based on the first estimated metric, one or more operations to be initiated with respect to at least some items of the item collection.

17. The one or more non-transitory computer-accessible storage media as recited in claim 16, wherein the instructions, when executed on or across one or more processors cause one or more computer systems to:

generate the forecasting request in response to a state change event of the first item.

18. The one or more non-transitory computer-accessible storage media as recited in claim 16, wherein the instructions, when executed on or across one or more processors cause one or more computer systems to:

generate forecasting requests to the trained version of the Bayesian forecasting model periodically for batches of items.

19. The one or more non-transitory computer-accessible storage media as recited in claim 16, wherein the one or more operations comprise one or more of: (a) a relocation of one or more items of the item collection, (b) an enhancement of a publicly-accessible customer support data set, (c) a removal of one or more items from the item collection or (d) a pricing change of one or more items of the data collection.

20. The one or more non-transitory computer-accessible storage media as recited in claim 16, wherein the instructions, when executed on or across one or more processors cause one or more computer systems to:

determine that the item belongs to the first category and a second category of the plurality of item categories, wherein the estimate of the metric of the first type of asynchronous operation is based at least in part on a category-level distribution of the first type of asynchronous operation corresponding to the second category.

* * * * *